United States Patent
Chillara et al.

(10) Patent No.: US 12,400,097 B1
(45) Date of Patent: Aug. 26, 2025

(54) PIEZOELECTRIC AND ACOUSTIC QUICK RESPONSE CODES

(71) Applicant: Triad National Security, LLC, Los Alamos, NM (US)

(72) Inventors: Vamshi Krishna Chillara, Los Alamos, NM (US); Christopher Nobuo Hakoda, Los Alamos, NM (US); Cristian Pantea, Los Alamos, NM (US)

(73) Assignee: TRIAD NATIONAL SECURITY, LLC, Los Alamos, NM (US)

( * ) Notice: Subject to any disclaimer, the term of this patent is extended or adjusted under 35 U.S.C. 154(b) by 317 days.

(21) Appl. No.: 17/724,261

(22) Filed: Apr. 19, 2022

Related U.S. Application Data

(60) Provisional application No. 63/176,622, filed on Apr. 19, 2021.

(51) Int. Cl.
*G06K 19/067* (2006.01)
*G06K 19/06* (2006.01)

(52) U.S. Cl.
CPC .............................. *G06K 19/06037* (2013.01)

(58) Field of Classification Search
CPC ....... G06K 19/06037; G06K 19/06046; G06K 19/0672
USPC ................................................. 235/494, 492
See application file for complete search history.

(56) References Cited

U.S. PATENT DOCUMENTS

2019/0188546 A1* 6/2019 Tabrizian ........... G06K 19/0675

OTHER PUBLICATIONS

Christopher Hakoda et al., "Investigation of resonance enhancement through non-uniform piezoelectric polarization for information storage methodology," Active and Passive Smart Structures and Integrated Systems XIV, Proc. of SPIE, 11376:113761M-1-113761M-6 (Apr. 2020). [Retrieved from the Internet Nov. 4, 2022: <URL: https://www.spiedigitallibrary.org/conference-proceedings-of-spie>].

Christopher Hakoda et al., "Multi-Level Information Storage Using Engineered Electromechanical Resonances of Piezoelectric Wafers: A Concept Piezoelectric Quick Response (PQR) Code," Sensors, 20(21):1-7, (2020).

Vamshi Krishna Chillara et al., "On the in-plane vibrations and electromechanical resonance characteristics of non-uniformly polarized rectangular piezoelectric wafers: Selective mode-type excitation and specific mode enhancement," Journal of Sound and Vibration, 506:1-20, (2021).

* cited by examiner

*Primary Examiner* — Paultep Savusdiphol
(74) *Attorney, Agent, or Firm* — Alston & Bird LLP

(57) ABSTRACT

Provided are acoustic quick response codes and piezoelectric quick response (PQR) codes. Examples of the disclosure leverage acoustics and vibrations for information storage and retrieval. Applications of examples of the disclosure may include the development of embedded product tags, tamper-evident seals and/or tags, and/or an additional layer of information storage used in conjunction with other existing information storage technologies. Examples further provide for the use of acoustic quick response codes or piezoelectric quick response codes as embedded sensors for damage detection and/or monitoring.

29 Claims, 20 Drawing Sheets

| Piezoelectric Wafer # | (1) | (2) | (3) | (4) | (5) | (6) |
| --- | --- | --- | --- | --- | --- | --- |
| Encoded Data | 0 | 1 | 2 | 2 | 0 | 1 |

| Piezoelectric Wafer # | (1) | (2) | (3) | (4) | (5) | (6) |
|---|---|---|---|---|---|---|
| Encoded Data | 0 | 1 | 2 | 2 | 0 | 1 |

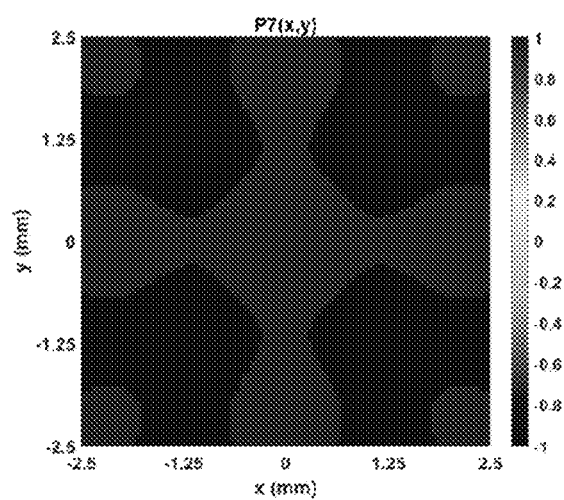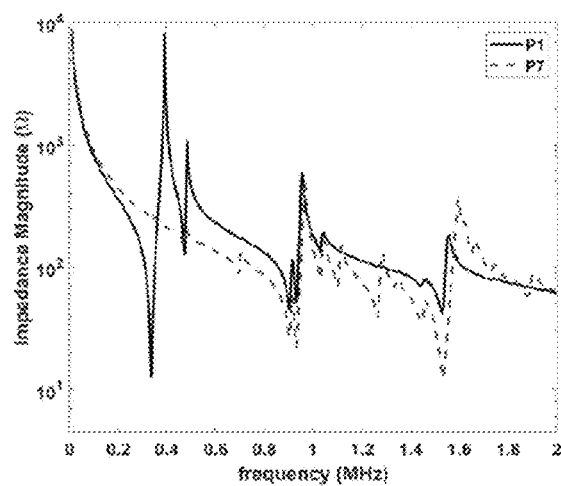
FIG. 18A
FIG. 18B

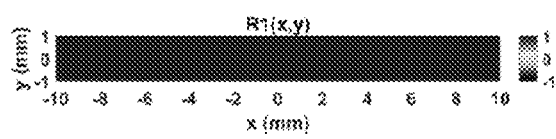 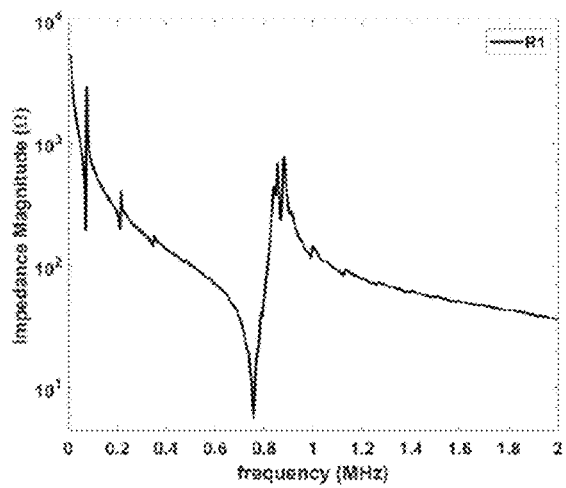
FIG. 19A                    FIG. 19B

PIEZOELECTRIC AND ACOUSTIC QUICK RESPONSE CODES

CROSS-REFERENCE TO RELATED APPLICATIONS

The present application claims priority to U.S. Provisional Application Ser. No. 63/176,622, titled "PIEZOELECTRIC AND ACOUSTIC QUICK RESPONSE CODES," filed Apr. 19, 2021, the contents of which are incorporated herein by reference in their entirety.

ACKNOWLEDGMENT OF GOVERNMENT SUPPORT

This invention was made with government support under Contract No. 89233218CNA000001 awarded by the U.S. Department of Energy/National Nuclear Security Administration. The government has certain rights in the invention.

TECHNICAL FIELD

The present disclosure relates generally to information storage methodologies and, more particularly, to the design and use of piezoelectric and acoustic quick response codes.

BACKGROUND

Non-traditional information storage has become increasingly ubiquitous as a means of providing interactive, environment-specific information. Two popular examples of this are Optical Quick Response (QR) codes and Radio-Frequency Identification (RFID) tags, which are used in product tags, anti-theft systems, tamper-evident seals, logistics, etc. However, Optical QR codes suffer from a security standpoint because they can be easily viewed and replicated because they are limited to the surface of objects. Further, RFID tags suffer from a security standpoint because they are prone to remote RFID skimming.

The inventors have identified a number of deficiencies and problems associated with existing identification storage methodologies. Through applied effort, ingenuity, and innovation, many of these identified problems have been solved by developing solutions that are included in embodiments of the present disclosure, many examples of which are described in detail herein.

SUMMARY

Embodiments of the present disclosure are directed to information storage, namely acoustic quick response codes and piezoelectric quick response (PQR) codes. Embodiments of the present disclosure rely upon acoustics and vibrations for information storage and retrieval. Applications associated with embodiments of the present disclosure may include the development of embedded product tags, tamper-evident seals and/or tags, and/or an additional layer of information storage used in conjunction with other existing information storage technologies. Embodiments of the present disclosure further provide for the use of acoustic quick response codes or piezoelectric quick response codes as embedded sensors for damage detection and/or monitoring.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Figure 1:
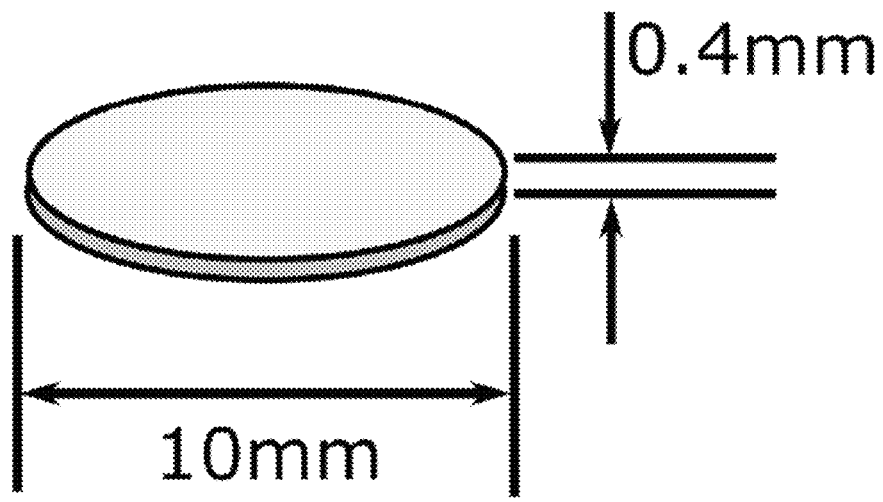
Figure 2:
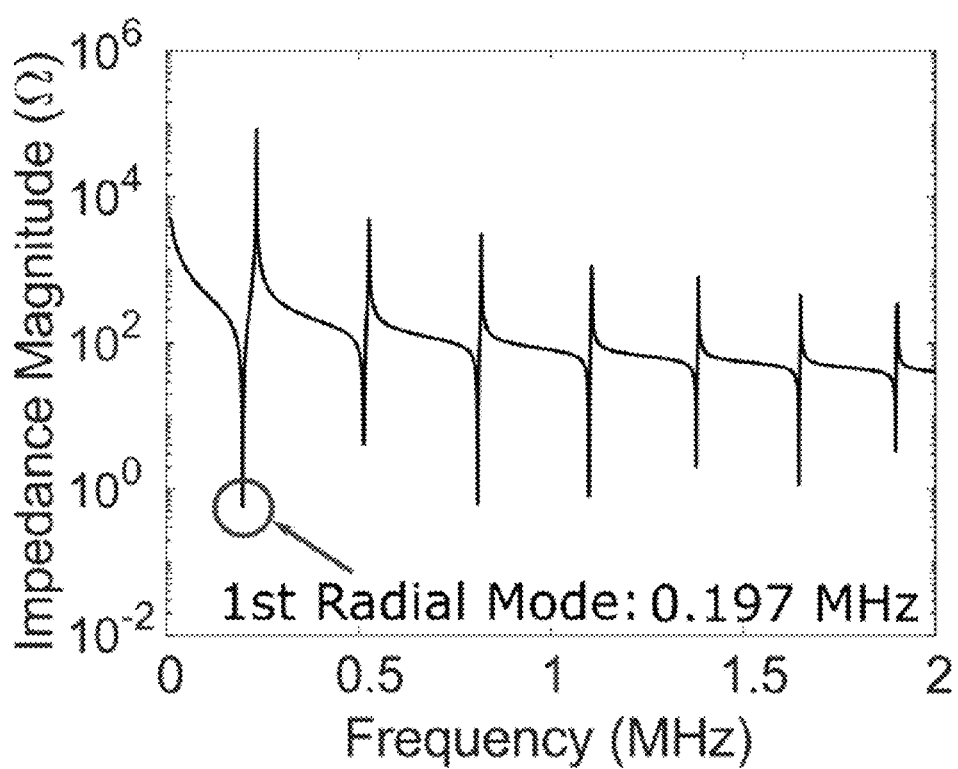
Figure 3:
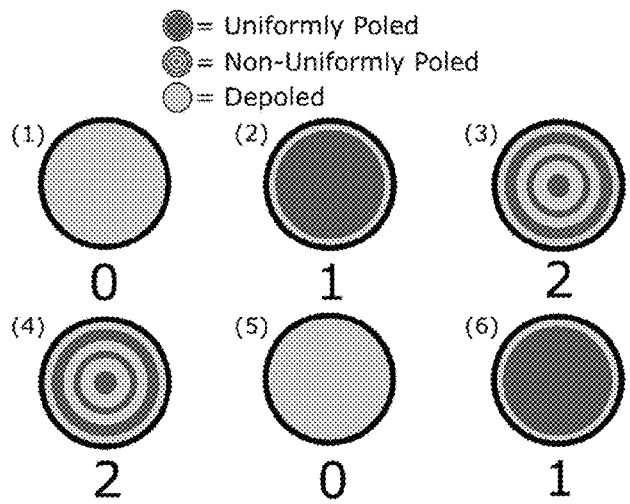
Figure 4:
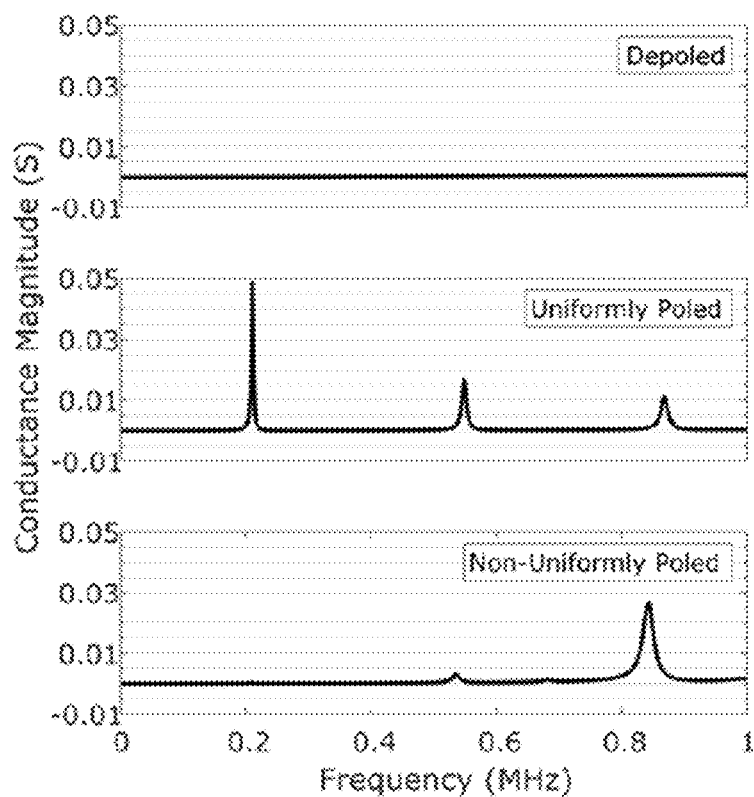
Figure 5A:
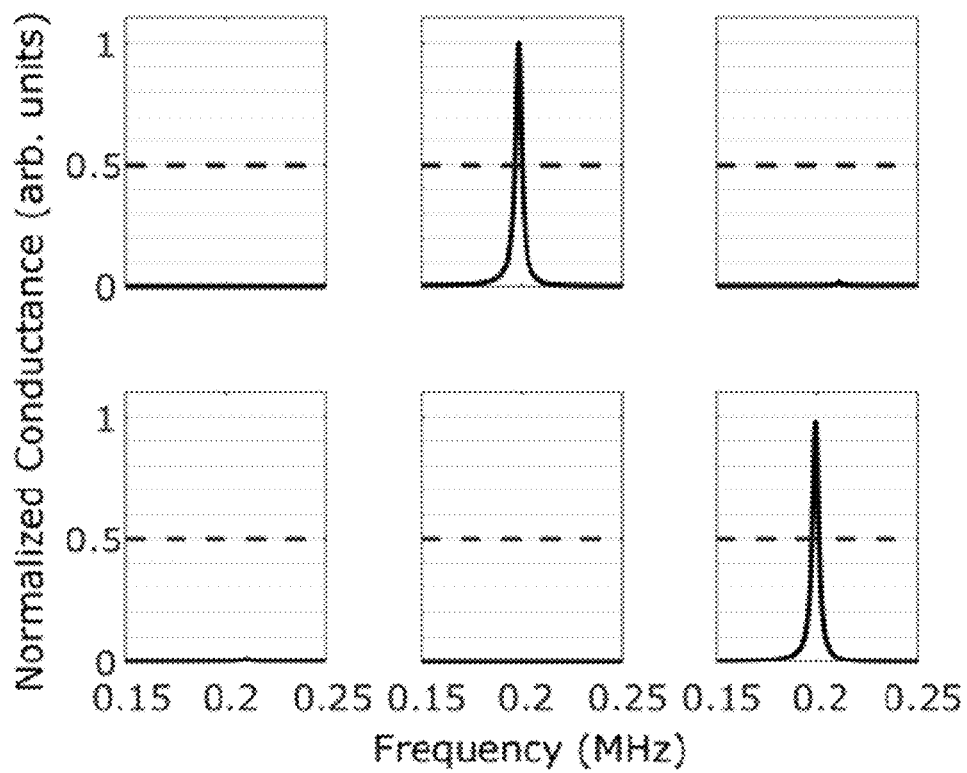
Figure 5B:
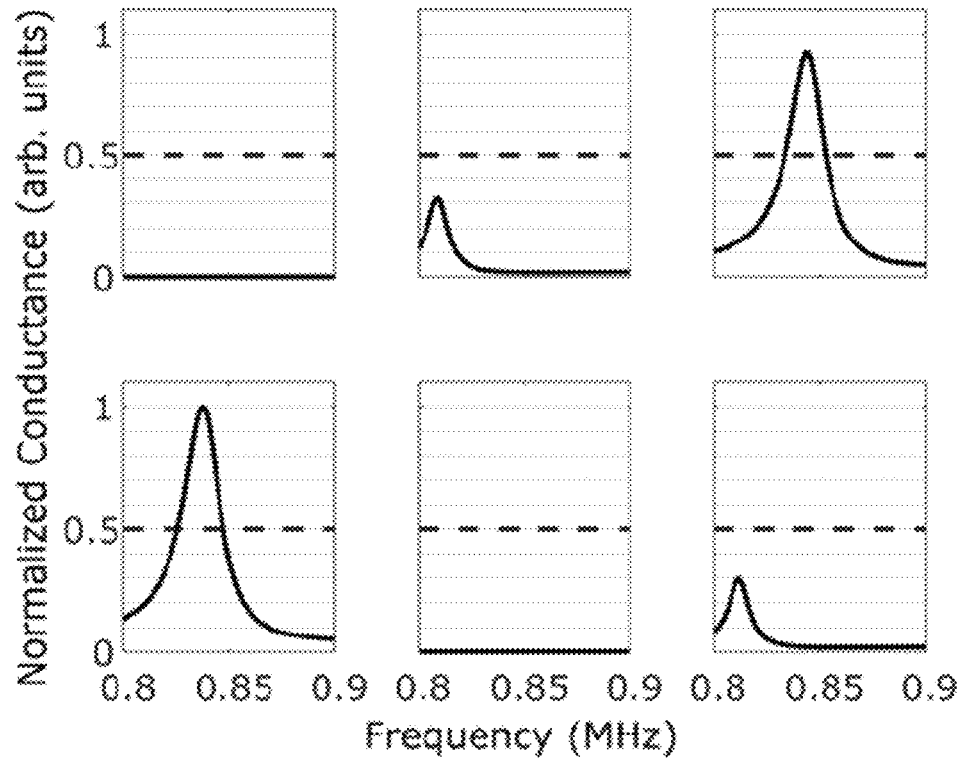
Figure 6A:
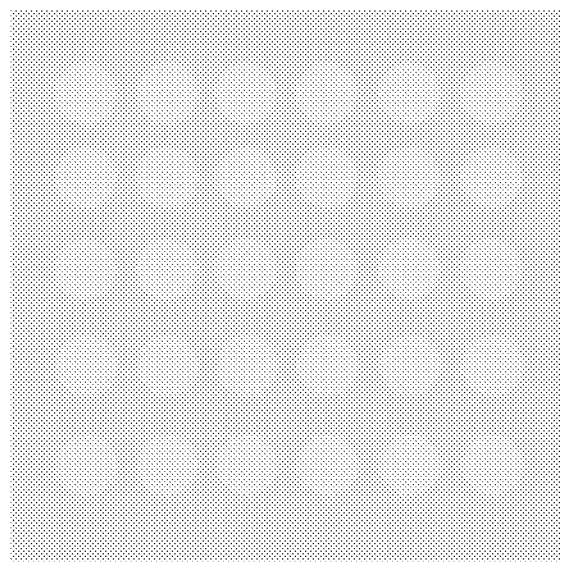
Figure 6B:
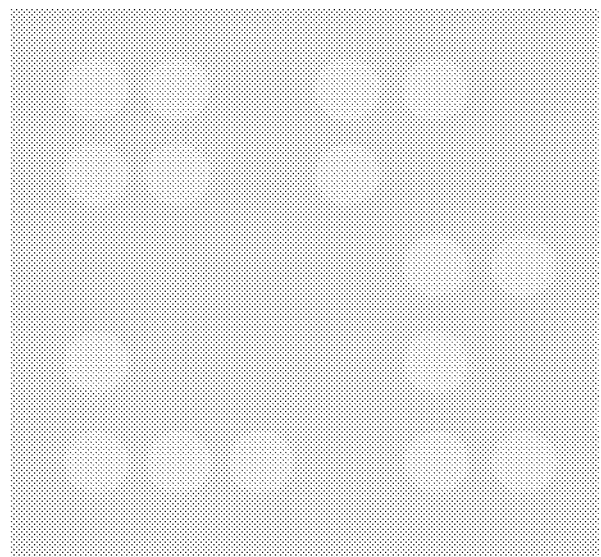
Figure 7:
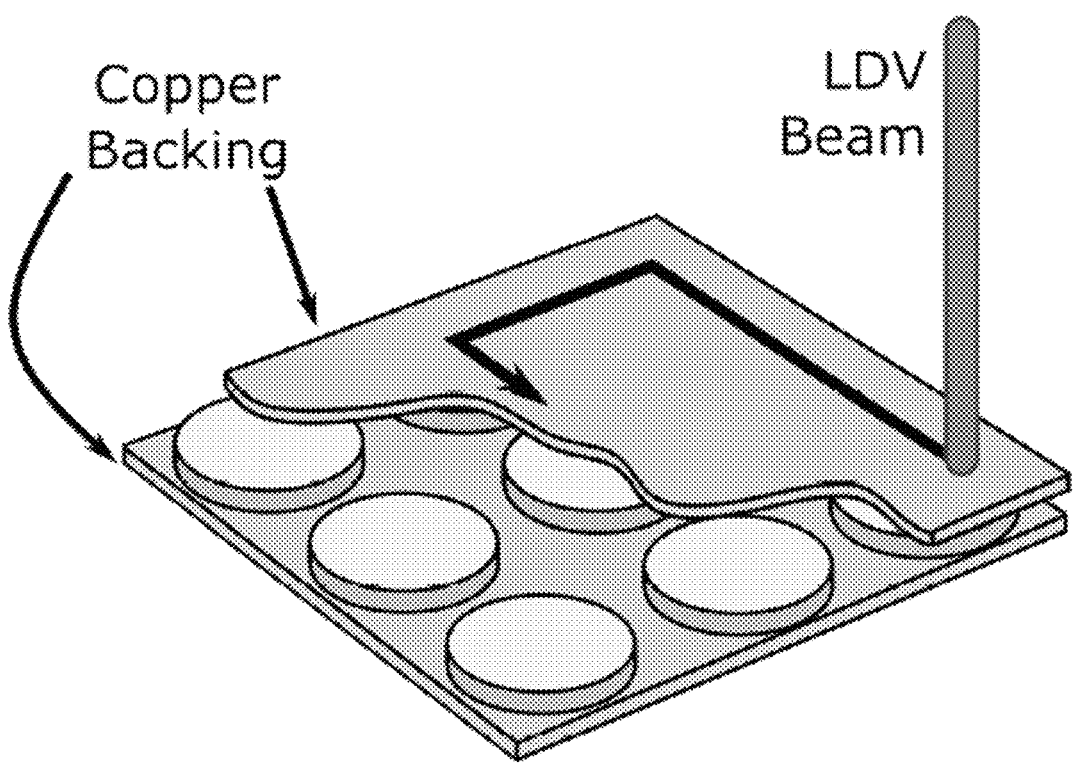
Figure 8:
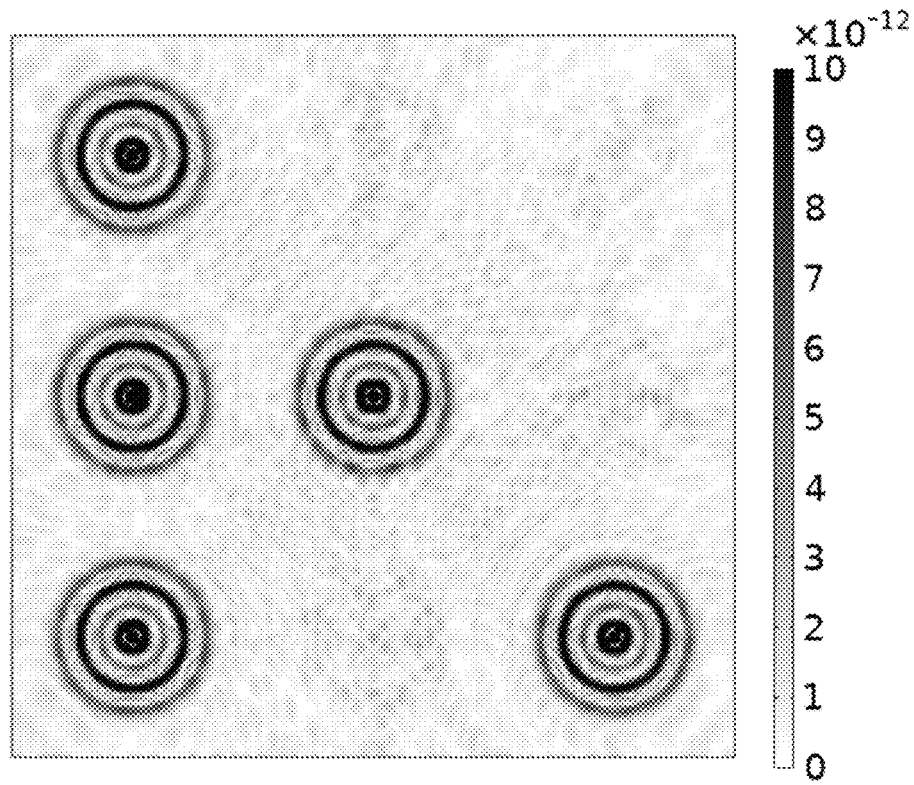
Figure 9:
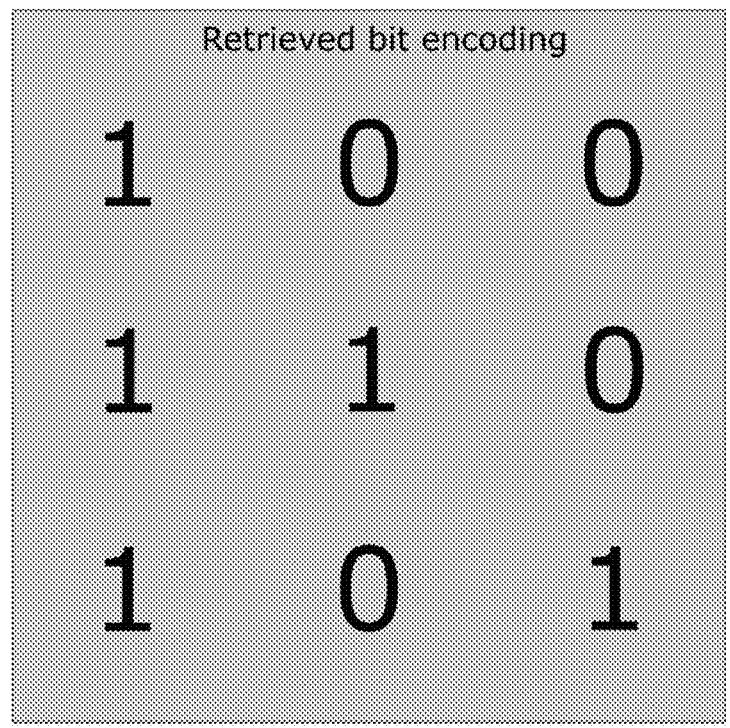
Figure 10:
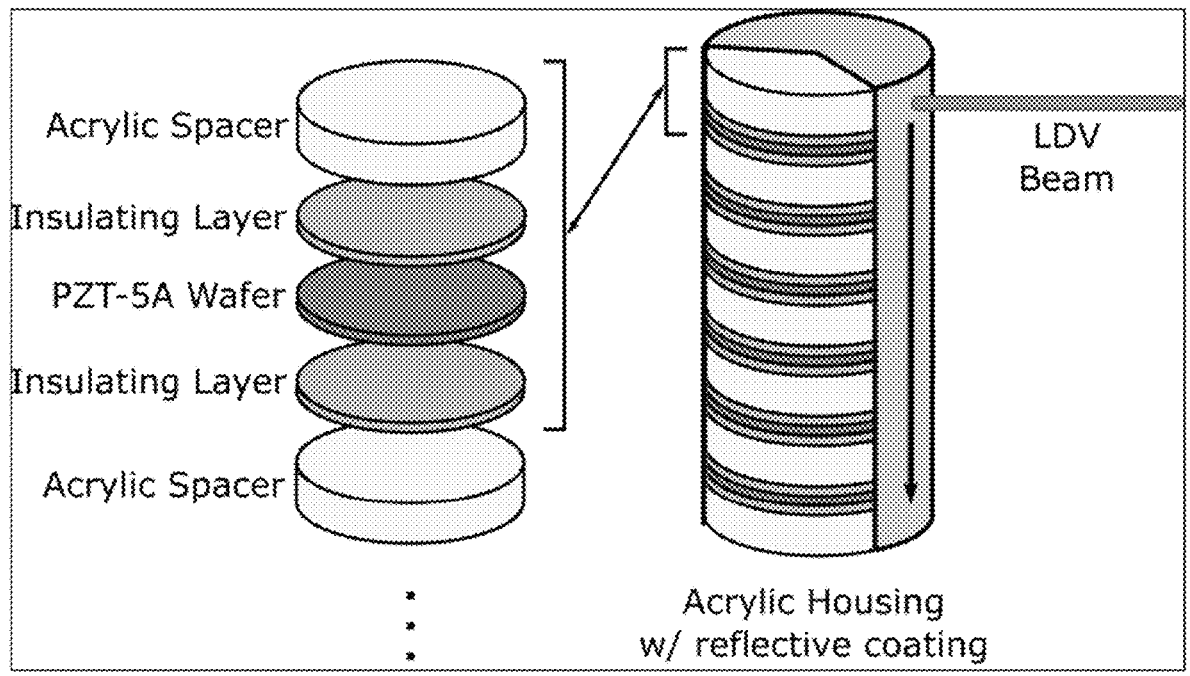
Figure 11:
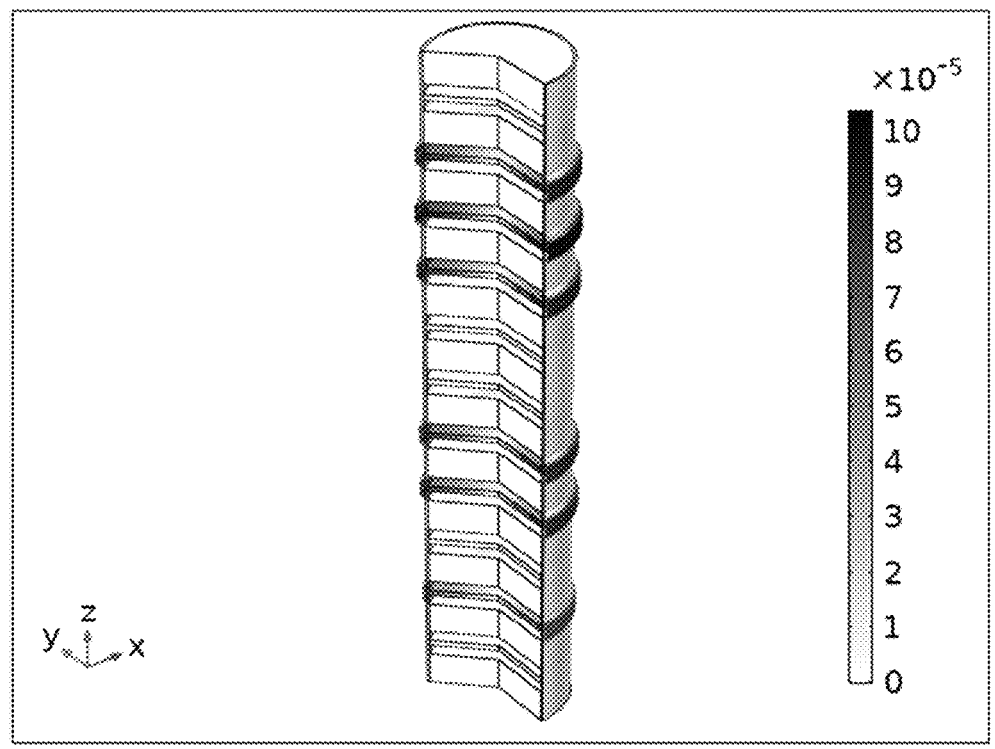
Figure 12:
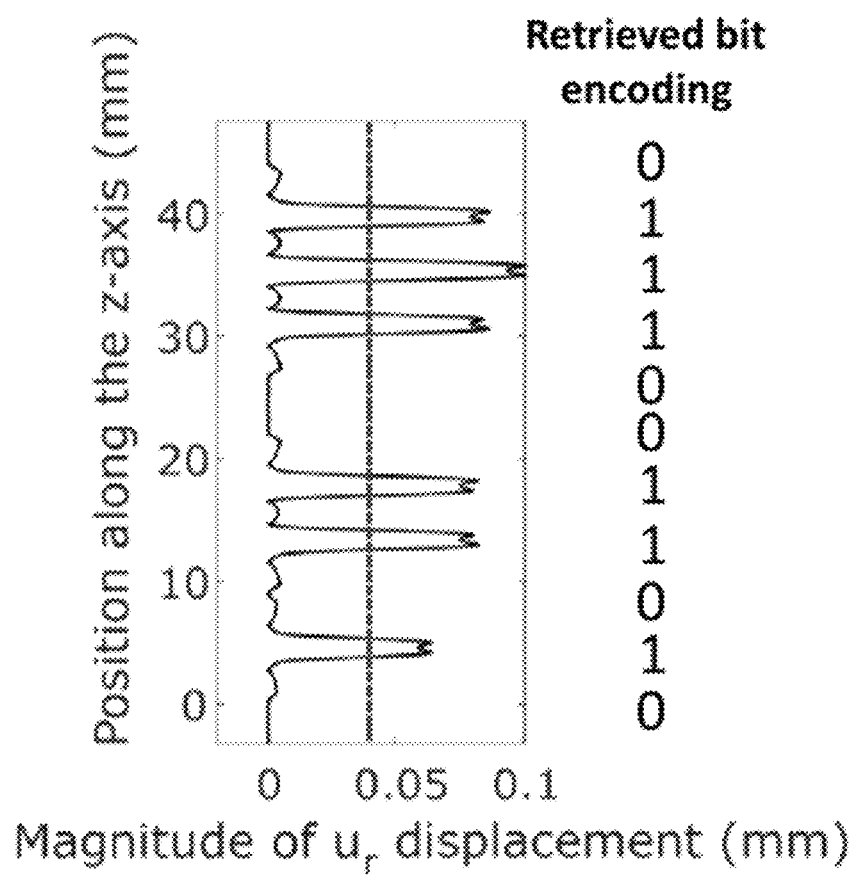
Figure 13:
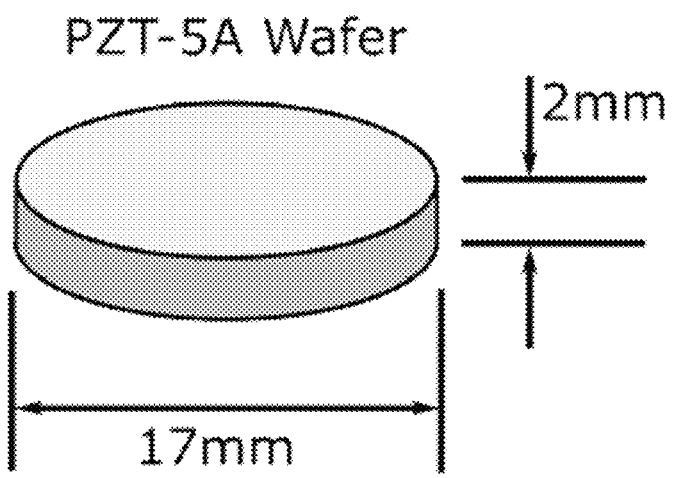
Figure 14:
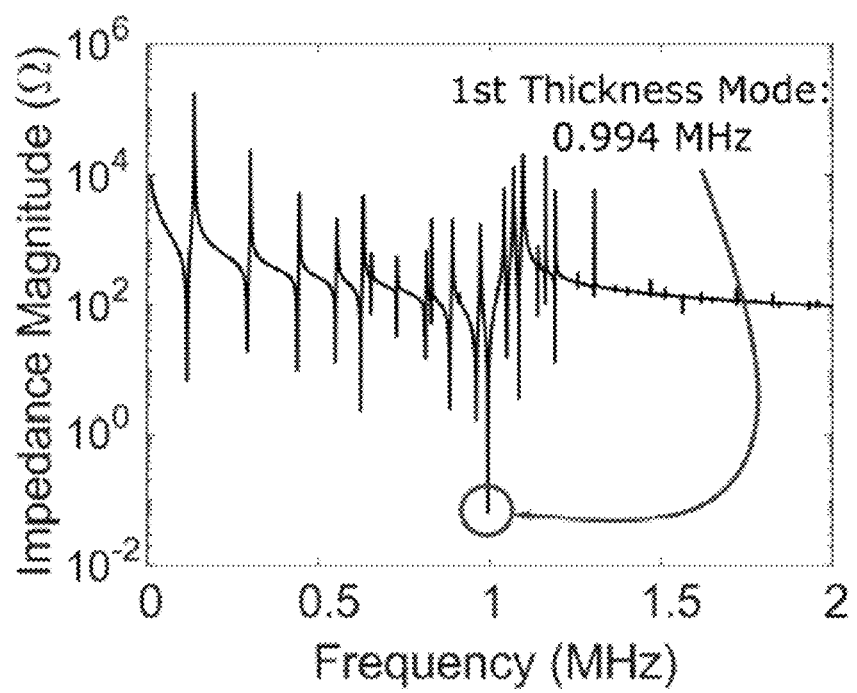
Figure 15A:
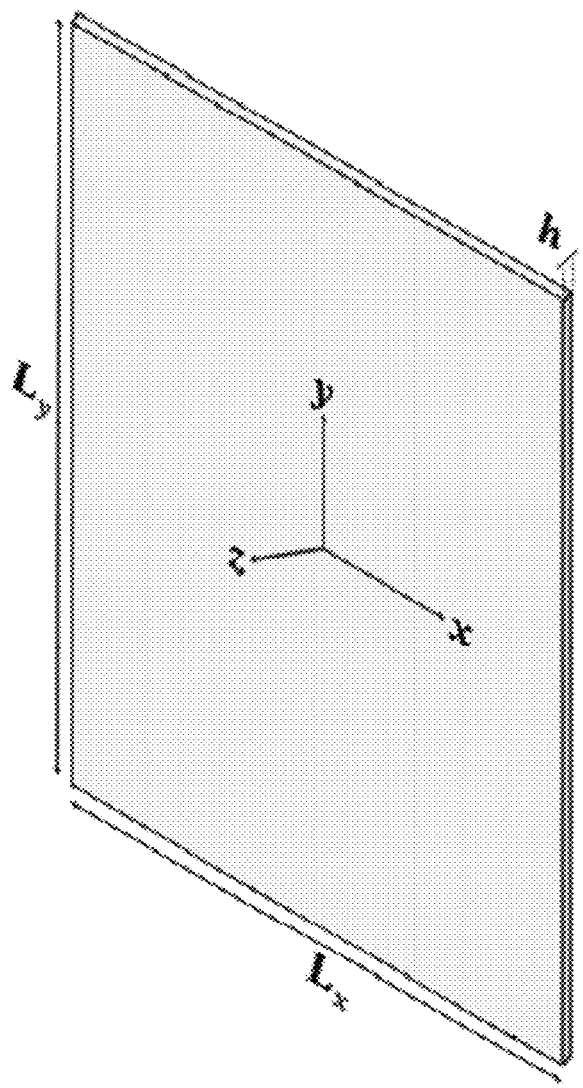
Figure 15B:
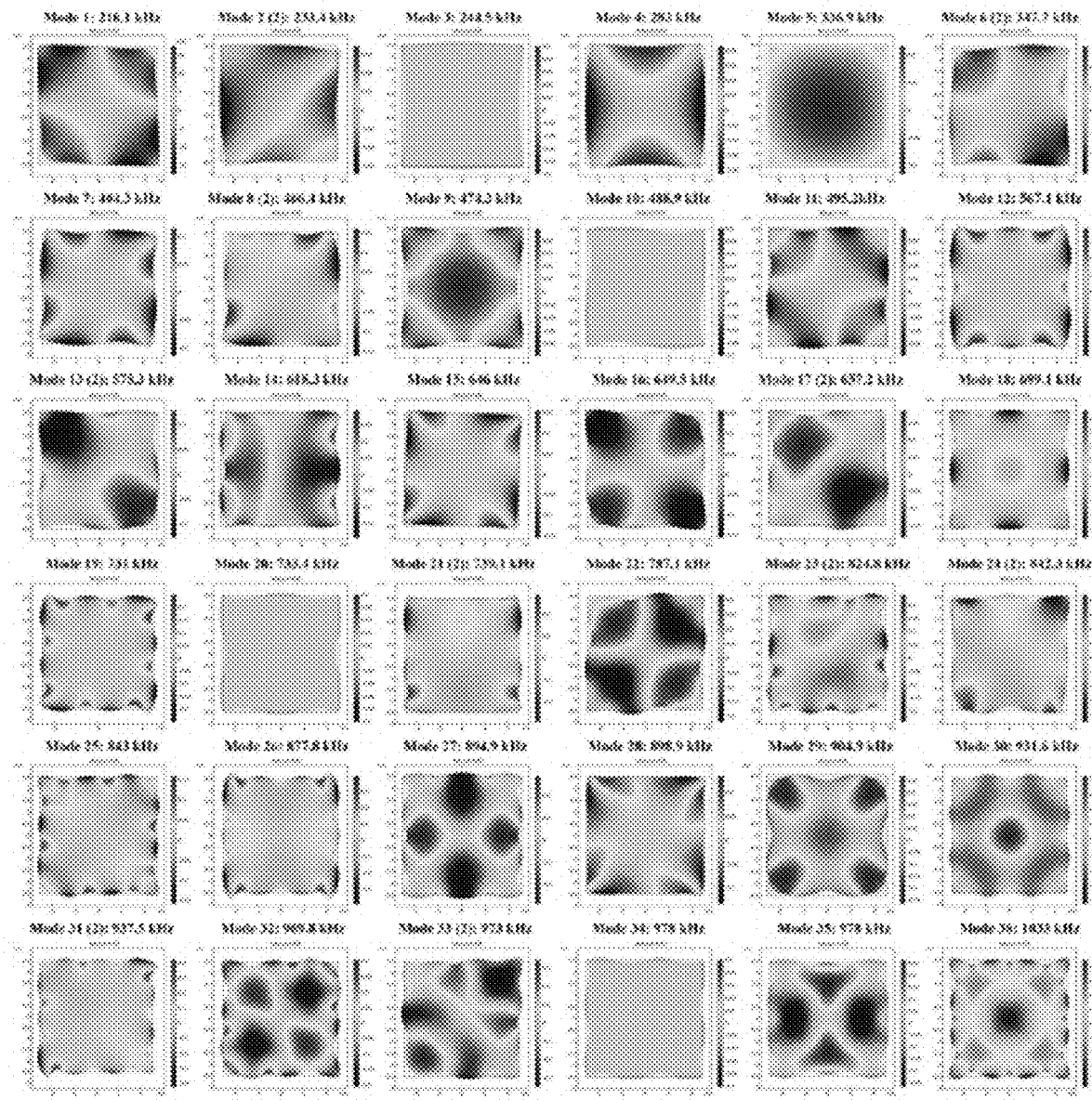
Figure 15C:
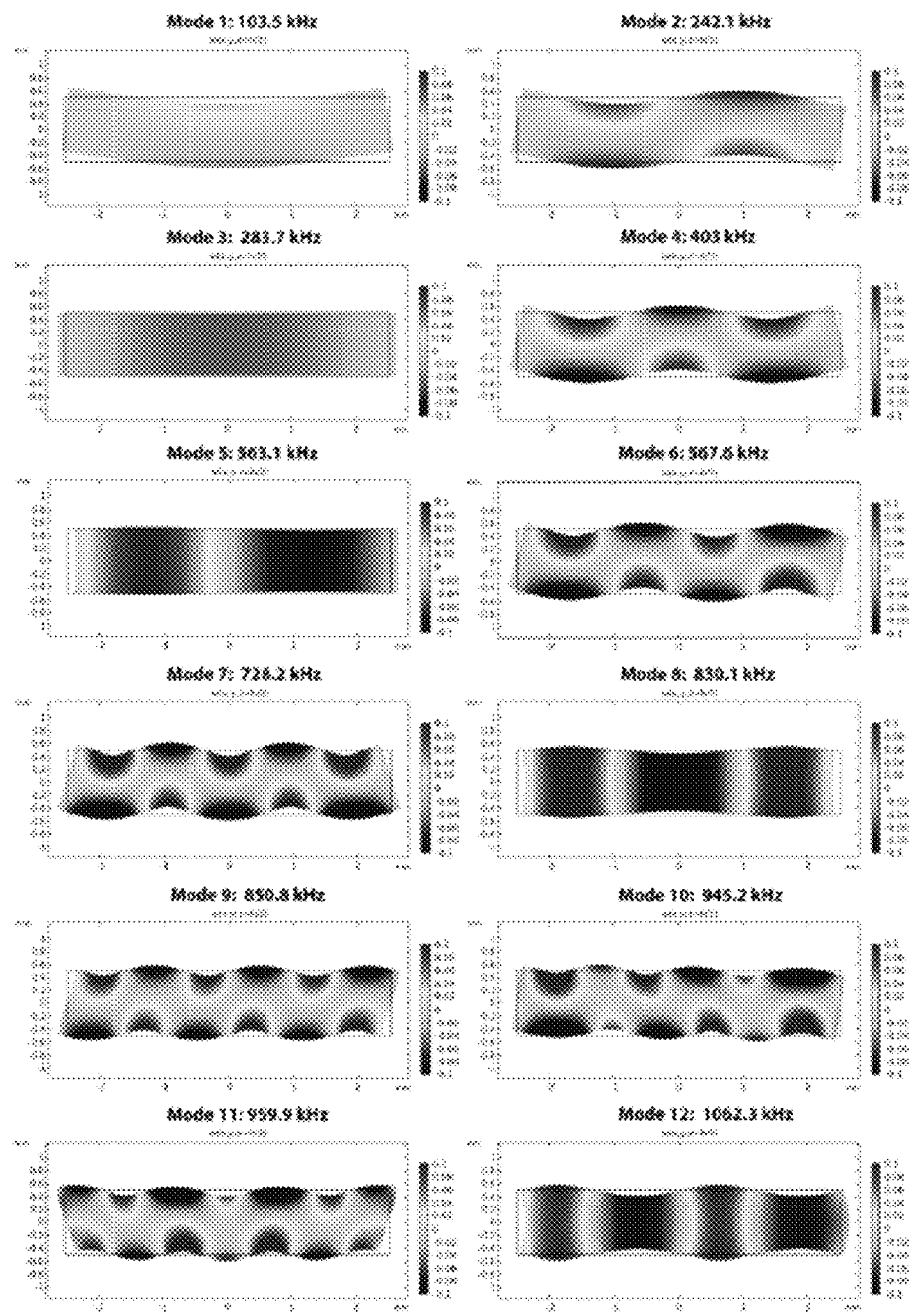
Figure 16A:
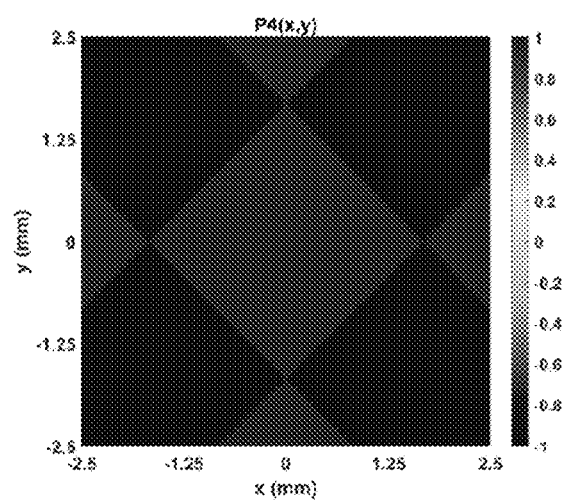
Figure 16B:
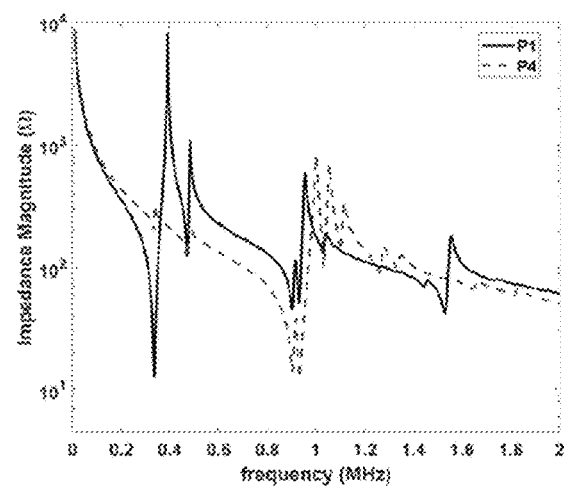
Figure 17A:
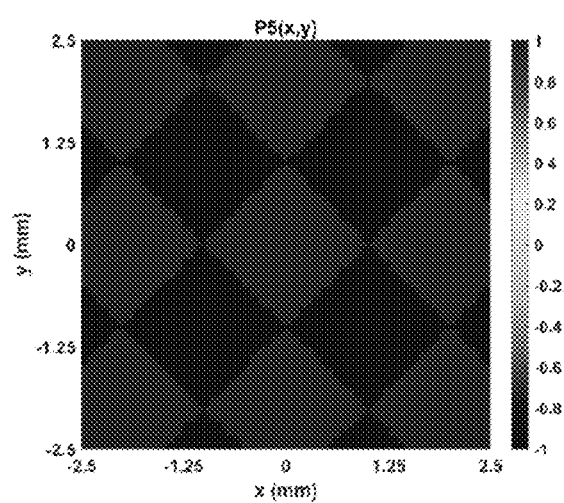
Figure 17B:
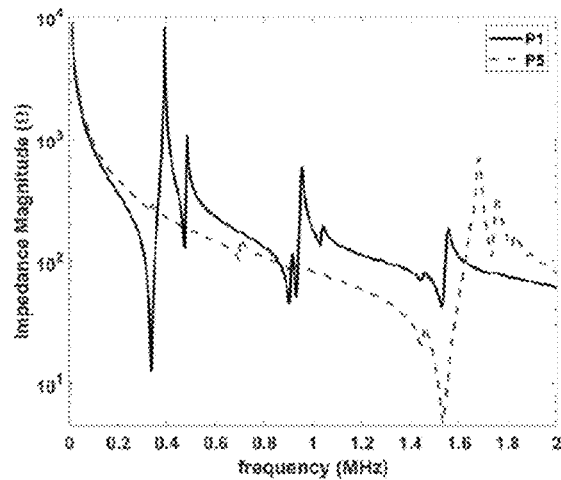
Figure 20A:
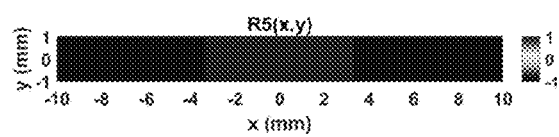
Figure 20B:
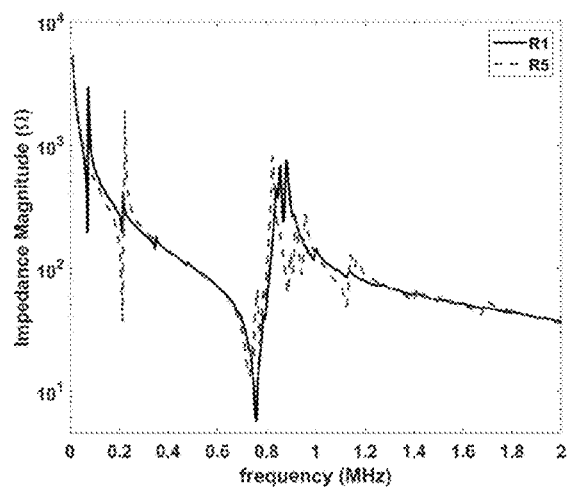
Figure 21A:
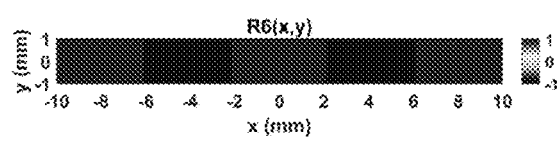
Figure 21B:
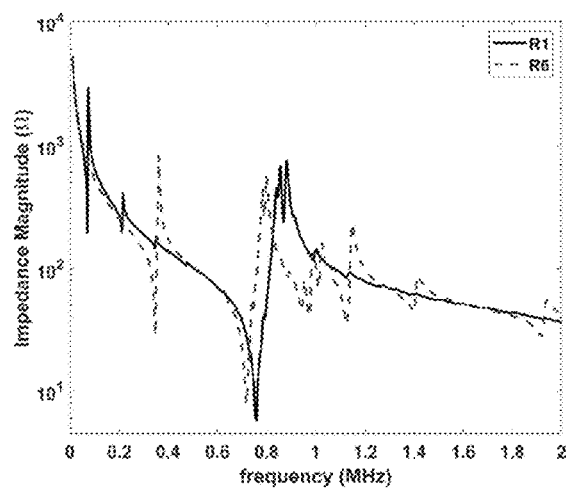
Figure 22A:
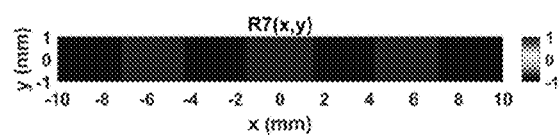
Figure 22B:
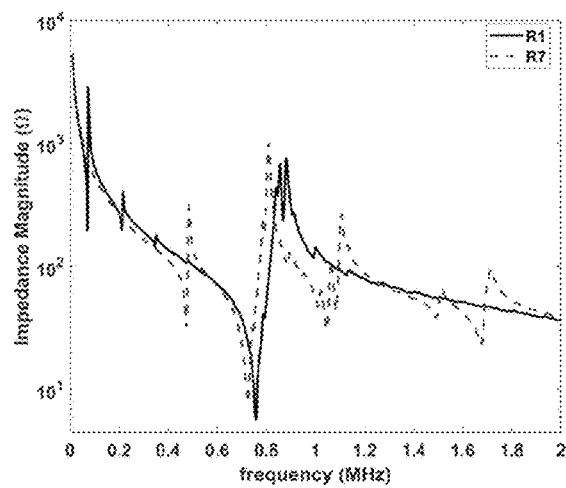
Figure 23A:
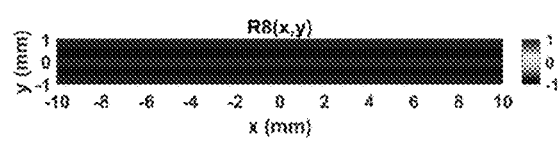
Figure 23B:
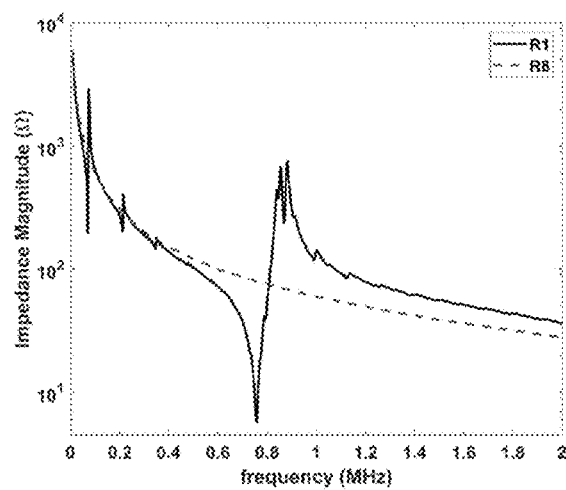

Having thus described the disclosure in general terms, reference will now be made to the accompanying drawings, which are not necessarily drawn to scale, and wherein:

FIG. 1 illustrates an example piezoelectric wafer for use with embodiments of the present disclosure;

FIG. 2 illustrates an example impedance spectra for a transducer according to the piezoelectric wafer of FIG. 1:

FIG. 3 illustrates an example configuration for a PQR code involving piezoelectric discs having differing polarization profiles for information encoding and/or storage, according to embodiments of the present disclosure:

FIG. 4 illustrates conductance magnitude spectra of de-poled, uniformly-poled, and non-uniformly poled piezoelectric wafers used for information retrieval, for use with embodiments of the present disclosure:

FIG. 5A illustrates a spectrum corresponding to a window of a first radial mode, according to embodiments of the present disclosure:

FIG. 5B illustrates a spectrum corresponding to a window of a third radial mode:

FIG. 6A illustrates an example PQR code that is optically unreadable for use with embodiments of the present disclosure:

FIG. 6B illustrates an example PQR code combined with an optical information detection configuration, for use with embodiments of the present disclosure FIG. 7 illustrates an example sandwich layout configuration for use with embodiments of the present disclosure:

FIG. 8 illustrates a top view of an example z-component of displacement associated with the example configuration depicted in FIG. 7, according to various embodiments of the present disclosure:

FIG. 9 illustrates an example bit encoding retrieved based on the displacement pattern shown in FIG. 8;

FIG. 10 illustrates an example cylindrical stack configuration for use with embodiments of the present disclosure:

FIG. 11 illustrates a cross-sectional view of an example cylindrical stack configuration for use with embodiments of the present disclosure:

FIG. 12 illustrates a radial displacement profile associated with an example cylindrical stack configuration for use with embodiments of the present disclosure:

FIG. 13 illustrates an example piezoelectric wafer for use with embodiments of the present disclosure:

FIG. 14 illustrates an example impedance spectra for a transducer according to the piezoelectric wafer of FIG. 13;

FIG. 15A illustrates a schematic of an example rectangular piezoelectric wafer for use with embodiments of the present disclosure:

FIG. 15B illustrates example vibrational mode shapes of multiple modes of an example square piezoelectric wafer for use with embodiments of the present disclosure:

FIG. 15C illustrates example vibrational mode shapes of multiple modes of an example rectangular piezoelectric wafer for use with embodiments of the present disclosure:

FIG. 16A illustrates an example non-uniform polarization profile for an example square wafer, for use with embodiments of the present disclosure:

FIG. 16B illustrates the electromechanical impedance spectrum of the example square piezoelectric wafer with non-uniform polarization of FIG. 16A to enhance second targeted resonance, according to embodiments of the present disclosure;

FIG. 17A illustrates an example non-uniform polarization profile for an example square wafer, for use with embodiments of the present disclosure;

FIG. 17B illustrates the electromechanical impedance spectrum of the example square piezoelectric wafer with non-uniform polarization of FIG. 17B to enhance third targeted resonance, according to embodiments of the present disclosure;

FIG. 18A illustrates an example non-uniform polarization profile for an example square wafer, for use with embodiments of the present disclosure;

FIG. 18B illustrates an electromechanical impedance spectrum of the example square piezoelectric wafer with non-uniform polarization of FIG. 18A to enhance both second and third targeted resonances, according to embodiments of the present disclosure;

FIG. 19A illustrates an example rectangular piezoelectric wafer with uniform polarization, for use with embodiments of the present disclosure;

FIG. 19B illustrates an electromechanical impedance spectrum of the example rectangular piezoelectric wafer with uniform polarization of FIG. 19A, according to embodiments of the present disclosure;

FIG. 20A illustrates an example non-uniform polarization profile for an example rectangular piezoelectric wafer, according to embodiments of the present disclosure;

FIG. 20B illustrates an electromechanical impedance spectrum of the example rectangular piezoelectric wafer with non-uniform polarization of FIG. 20A to enhance second targeted resonance, according to embodiments of the present disclosure;

FIG. 21A illustrates an example non-uniform polarization profile for an example rectangular piezoelectric wafer, for use with embodiments of the present disclosure;

FIG. 21B illustrates an electromechanical impedance spectrum of the example rectangular piezoelectric wafer with non-uniform polarization of FIG. 21A to enhance third targeted resonance, according to embodiments of the present disclosure;

FIG. 22A illustrates an example non-uniform polarization profile for an example rectangular piezoelectric wafer, for use with embodiments of the present disclosure;

FIG. 22B illustrates an electromechanical impedance spectrum of the example rectangular piezoelectric wafer with non-uniform polarization of FIG. 22A to enhance fourth targeted resonance, according to embodiments of the present disclosure;

FIG. 23A illustrates an example non-uniform polarization profile for an example rectangular piezoelectric wafer, for use with embodiments of the present disclosure; and FIG. 23B illustrates an electromechanical impedance spectrum of the example rectangular piezoelectric wafer with non-uniform polarization of FIG. 23A to suppress all the resonances observed in FIG. 22B, according to embodiments of the present disclosure.

DETAILED DESCRIPTION

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

Embodiments herein provide for a piezoelectric based information storage method which enables visibly indistinguishable features, is incompatible with skimming, and can be used with a QR-type encoding scheme. Embodiments herein overcome draw backs associated with information storage methodologies that rely upon a radio-frequency response (e.g., RFID) or an optical response (e.g., QR codes, bar codes, or the like) because embodiments herein rely upon acoustics or vibration responses of the materials used for storing the information (e.g., piezoelectric materials, transducers, or the like). Eliminating reliance upon an optical or visual response eliminates a need for exposing a representation of information on an external surface (e.g., embodiments herein may be embedded within objects or behind walls and the information stored may still be retrieved without direct visual observance).

The presently disclosed information storage method involves an array of transducers with engineered resonance profiles showing a frequency-dependent response. Embodiments herein present methods of engineering resonance profiles for multiple shapes (e.g., circular, elliptic, rectangular, square, and the like) of a piezoelectric wafer. Embodiments herein enable the use of non-uniform poling/polarization of piezoelectric wafers to enhance specific resonances. Simulation results and a discussion of changes to the resonance characteristics resulting from non-uniform poling are also included herein.

Non-limiting examples of materials for use in piezoelectric wafers described herein include lead zirconate titanate or PZT, ceramic, polycrystalline, or other suitable piezoelectric material.

Embodiments herein provide for configurations that leverage various resonant properties of piezoelectric materials. For example, a piezoelectric or piezoceramic disc may be associated with resonance values based on reflections of ultrasound within the body of the disc. That is, resonance at lowest frequencies correspond to motion in the largest dimension of the piezoelectric or piezoceramic disc, which may correspond to the radial direction of the disc. In embodiments, resonance in a radial direction of a piezoelectric disc, wafer, or layer, may be referred to as a radial mode or radial excitation mode. When targeting a radial excitation mode, embodiments herein may preferably excite a piezoelectric disc at a frequency at which displacement will occur and be detectable in a radial direction of the piezoelectric disc.

Alternatively or in addition, resonance at higher frequencies may correspond to motion in a smaller dimension of the piezoelectric or piezoceramic disc, which may correspond to the thickness direction of the disc. In embodiments, resonance in a thickness direction of a piezoelectric disc, wafer, or layer, may be referred to as a thickness mode or thickness excitation mode. When targeting a thickness excitation mode, embodiments herein preferably excite a piezoelectric disc at a frequency at which displacement will occur and be detectable in a thickness direction of the piezoelectric disc.

In various embodiments of the present disclosure, electromechanical resonance spectra of a piezoelectric wafer may be engineered (e.g., using non-uniform polarization) to enhance different resonances in the frequency spectrum to represent different information states. For example, a de-poled piezoelectric disc could be used to represent a "0" and an enhanced first resonance of the disc could be used to represent a "1". In such a manner, enhancing multiple resonances of a single piezoelectric element increases the memory density of the element because multiple layers of information may be stored and retrieved using the single element.

In embodiments, for a circular piezoelectric wafer, a specific radial mode may be enhanced or increased by alternating the polarization of concentric regions to match the mode's out-of-plane displacement profile.

In embodiments, for thin, square-shaped (or arbitrarily shaped) piezoelectric wafers, different types of polarization profiles may be used. For example, a de-poled wafer may be a piezoelectric wafer that is not polarized. When measured, such a wafer may not exhibit electromechanical resonances. In other examples, a uniformly poled wafer may have uniform polarization throughout the wafer with all the dipoles aligned along the thickness of the wafer. When measured, a uniformly poled wafer yields all of the electromechanical resonances typically observed for the wafer's geometry. In yet other examples, a non-uniformly poled wafer has a polarization profile that is engineered to enhance a specific resonant mode. When measured, a non-uniformly poled wafer yields a stronger resonance at a targeted mode while the surrounding modes may be suppressed.

In embodiments, enhanced or suppressed electromechanical resonances enable bit encoding beyond binary. That is, while conventional methodologies may be constrained to a two bits of information, and therefore only a "0" or a "1," embodiments herein enable ternary or higher encoding with more states (e.g., "0)", "1", "2", "3", "4" and the like). Benefits associated with altering a polarization profile of a piezoelectric wafer, but not its geometry, include that the wafers representing different information states look exactly identical to one another. This provides additional security and acts as a deterrent for potential tampering.

FIG. 1 illustrates an example piezoelectric wafer for use with embodiments of the present disclosure. In FIG. 1, an example piezoelectric wafer includes characteristics associated with being designed for excitation of radial modes. An example piezoelectric wafer is associated with a given thickness (e.g., 0.4 mm) and a given diameter (e.g., 10 mm). In some embodiments, the piezoelectric wafer may be a suitable piezoelectric material based wafer as described herein. In some non-limiting embodiments, a piezoceramic such as PZT-5A may be preferable for applications that have extreme and/or widely varying temperatures but where performance is preferably not compromised due to variance in temperature (e.g., performance should remain constant). FIG. 2 illustrates an example impedance spectra for a transducer according to the piezoelectric wafer of FIG. 1.

FIG. 3 illustrates an example configuration involving piezoelectric discs having differing polarization profiles, according to embodiments of the present disclosure. In FIG. 3, six piezoelectric wafers are arranged in a 2-by-3 array. In some embodiments, this may be referred to without limitation as an example piezoelectric quick response (PQR) code. The first row of the 2-by-3 array consists of the three types of polarizations in the order of the 'trit' they represent, while the second row is mixed up to prevent potential bas based on positioning. The piezoelectric wafers are labeled with a number in the upper left corner, and the intended trit is labeled below the corresponding piezoelectric wafer.

Information retrieval from the PQR code of FIG. 3 may be accomplished, in certain embodiments, by normalizing the conductance spectra shown in FIG. 4. Upon normalization, the following example criteria may be used for retrieving the encoded data:

'0' trit: there are no peaks above threshold at the first and third radial modes;
'1' trit: there is a peak above threshold at the first radial mode, but not at the third radial mode; and
'2' trit: there is a peak above threshold at the third radial mode, but not at the first radial mode.

In embodiments, the above referenced information retrieval may be made more robust by windowing the data around the first and third radial modes and by identifying the presence or absence of a peak in each window. The window around the first radial mode is chosen to be 0.15-0.25 MHz, and the window around the third radial mode is chosen to be 0.8-0.9 MHZ. This accounts for any variability in the measured conductance spectrum resulting from the fabrication process. FIG. 5A illustrates the spectrum corresponding to the window of the first radial mode and FIG. 5B illustrates the spectrum corresponding to the window of the third radial mode.

FIG. 6A illustrates an example PQR code for use with embodiments of the present disclosure. FIG. 6B illustrates an example PQR code combined with an optical information detection configuration, for use with embodiments of the present disclosure. Because the piezoelectric elements of the PQR code of FIG. 6A are uniform, any optical scanning of the code will be meaningless. In FIG. 6B, spatial distribution of the piezoelectric elements may be scanned or observed by a conventional QR scanner, and an electromechanical response of the piezoelectric elements may be measured for an additional information storage mechanism.

FIG. 7 illustrates an example sandwich layout configuration for use with embodiments of the present disclosure. Benefits associated with what is referred to herein without limitation as a sandwich layout include that the layout is simple and card-like in shape, and minimal wiring may be required by such a layout. Some considerations associated with a sandwich layout include that thickness modes occur at higher frequencies, and the substrates surrounding the piezoelectric wafers may include flexural plate resonances that may bury a displacement signal (e.g., make it difficult to detect displacement as a result of excitation) unless they are mitigated or dampened. Another consideration includes the possibility of complicated detection methodologies (e.g., a possibly complicated scanning path (e.g., using a laser doppler vibrometer (LDV), other scanning vibrometer, optical microphone, EMAT (e.g., if there is a metal layer present), or other suitable instrument for obtaining non-contact vibration measurements of a surface).

In FIG. 7, a schematic view illustrates how a sandwich layout form factor of various embodiments of the present disclosure may be constructed. In various embodiments, a plurality of piezoelectric wafers (e.g., piezoelectric discs) are positioned between a first substrate and a second substrate (e.g., "Copper Backing"). That is, each piezoelectric wafer of the plurality of piezoelectric wafers has a first surface and a second surface, and the first substrate (e.g., "Copper Backing") is adjacent the plurality of piezoelectric wafers along the first surface (e.g., front or top) of each of the piezoelectric wafers, and the second substrate (e.g., "Copper Backing") is adjacent the plurality of piezoelectric wafers along the second surface (e.g., back or bottom) of each of the piezoelectric wafers. Further, in various embodiments, each piezoelectric wafer is positioned relative to other piezoelectric wafers of the plurality of piezoelectric wafers according to an identification layout. In embodiments, and shown in FIG. 7, the identification layout may comprise an array or grid. In embodiments, the first substrate and the second substrate may comprise copper.

In embodiments, the first substrate and the second substrate uniformly excite resonances of the piezoelectric wafers. In various embodiments, a low-reflecting boundary or damping layer is applied or employed to help mitigate any flexural resonances of either of the first substrate or the second substrate.

FIG. 8 illustrates a top view of an example z-component of displacement associated with the example configuration depicted in FIG. 7, according to various embodiments of the present disclosure.

In various examples, the sandwich layout depicted in FIG. 7 may be excited. For example, the sandwich layout depicted in FIG. 7 may be excited at a given thickness mode (e.g., 0.994 MHz). Accordingly, the piezoelectric wafers or layers exhibit displacement, as shown in FIG. 8. In embodiments, excitation and non-contact measurements may be obtained using an example sandwich layout configuration depicted in FIG. 7 by way of directing a laser doppler vibrometer (LDV) at the first substrate (e.g., copper backing) and sweeping the LDV according to a pattern along the first substrate (e.g., in a first direction along a first subset of the plurality of piezoelectric discs of the identification layout, moving to a second subset of the plurality of piezoelectric discs and returning in a second direction along the second subset, and moving to a third subset of the plurality of piezoelectric discs and returning in the first direction along the third subset, and so on) such that each piezoelectric disc of the configuration is excited and associated displacement or vibration may be observed.

FIG. 9 illustrates an example bit encoding based on the displacement pattern shown in FIG. 8. In FIG. 9, the displacement pattern of FIG. 8 results in an ability to detect encoded bits of information (e.g., the presence of a "0" or a "1") for the purposes of retrieving stored information).

Shown in FIG. 9, retrieved bit encoding is associated with a magnitude of displacement according to a detection of a z-component of the example configuration depicted in FIG. 8. That is, radial displacement of a piezoelectric wafer or layer is detected and depending upon the magnitude of the detected displacement (e.g., whether the displacement exceeds a displacement threshold), a bit encoding associated with the piezoelectric wafer or layer is assigned a bit value of "0" or "1." For example, when the magnitude of detected displacement associated with a given piezoelectric wafer or layer exceeds a displacement threshold, the associated bit encoding is represented as a "1." Otherwise, the associated bit encoding is represented as a "0."

FIG. 10 illustrates an example cylindrical stack configuration for use with embodiments of the present disclosure. Benefits associated with a cylindrical stack configuration include that radial excitation modes (e.g., associated with available radial displacement) occur at lower frequencies. Further, the cylindrical stack configuration is associated with a simple shape and is potentially more compact due to thinner transducers (e.g., piezoelectric wafers or layers). Additional considerations for designs employing an example cylindrical stack configuration or form factor include that the wiring can be slight complex, the housing (e.g., an acrylic housing) may be flexural resonances associated therewith that may need to be accounted for during excitation and displacement detection, and the addition of insulating layers and acrylic spacers may further introduce flexural resonances that may need to be accounted for during excitation and displacement detection.

In FIG. 10, a schematic view illustrates how an example cylindrical stack form factor of various embodiments may be constructed. In various embodiments, a piezoelectric layer (e.g., "PZT-5A Wafer") (e.g., a piezoelectric disc) having a first surface and a second surface is positioned between insulating layers. That is, a first insulating layer (e.g., "Insulating Layer") is positioned adjacent (e.g., above) the first surface of the piezoelectric layer (e.g., "PZT-5A Wafer") and a second insulating layer (e.g., "Insulating Layer") positioned adjacent (e.g., below) the second surface of the piezoelectric layer (e.g., "PZT-5A Wafer"). Further shown in FIG. 10, a housing (e.g., "Acrylic Housing w/reflective coating") may be configured to house the piezoelectric layer (e.g., "PZT-5A Wafer") as well as the first and second insulating layers (e.g., "Insulating Layer") and multiple spacer layers (e.g., "Acrylic Spacer"). That is, a first spacer layer (e.g., "Acrylic Spacer") is positioned between (e.g., below) a proximal end (e.g., top or near end) of the housing and the first insulating layer (e.g., "Insulating Layer") and a second spacer layer (e.g., "Acrylic Spacer") is positioned between (e.g., above) a distal end (e.g., a bottom or far end) of the housing and the second insulating layer (e.g., "Insulating Layer). In embodiments, the housing may be acrylic and may have a reflective coating. In embodiments, the first and second spacer layers may be acrylic. In embodiments, the housing may have a reflective coating applied thereto so that it is compatible with LDV measurements.

FIG. 11 illustrates a cross-sectional view of an example cylindrical stack configuration for use with embodiments of the present disclosure. In embodiments, an example cylindrical stack as shown in FIG. 10 may be extended along a z-axis by stacking a plurality of cylindrical stack form factors of FIG. 10 adjacent one another and within the housing. That is, an order of layers of an example cylindrical stack configuration may include an (e.g., a first) acrylic spacer adjacent an (e.g., a first) insulating layer, which is adjacent a (e.g., a first) piezoelectric wafer or layer. The piezoelectric wafer or layer may be adjacent another (e.g., a second) insulating layer, which is adjacent another (e.g., a second) acrylic spacer. The second acrylic spacer may have adjacent thereto, at a surface opposite the second insulating layer, yet another (e.g., a third) insulating layer that may be adjacent yet another (e.g., a second) piezoelectric wafer or layer. The second piezoelectric wafer or layer may then be adjacent to yet another (e.g., a fourth) insulating layer that may be adjacent yet another (e.g., a third) acrylic spacer. The third acrylic spacer may be adjacent yet another (e.g., a fifth) insulating layer, and the pattern may similarly repeat in a manner that achieves a desired number of piezoelectric wafers or layers within the housing.

In various examples, the cylindrical stack depicted in FIG. 11 may be excited. For example, the cylindrical stack depicted in FIG. 11 may be excited at a given radial mode (e.g., 0.197 MHz). Accordingly, the piezoelectric wafers or layers exhibit radial displacement, as shown in FIG. 11. In embodiments, excitation and non-contact measurements may be obtained using an example cylindrical stack configuration depicted in FIG. 10 by way of directing a laser doppler vibrometer (LDV) at the housing and sweeping the LDV along a length (e.g., from a proximal end to a distal end) of the housing. In such a manner, the LDV may be used to measure and/or observe the displacement or vibration of each piezoelectric disc of the configuration.

FIG. 12 illustrates a radial displacement profile associated with an example cylindrical stack configuration for use with embodiments of the present disclosure. Shown in FIG. 12, retrieved bit encoding is associated with a magnitude of $u_r$ (e.g., radial) displacement (in millimeters (mm)) according to a position along a z-axis (also in mm) of the example configuration depicted in FIG. 11. That is, radial displacement of a piezoelectric wafer or layer is detected and depending upon the magnitude of the detected radial displacement (e.g., whether the radial displacement exceeds a radial displacement threshold), a bit encoding associated with the piezoelectric wafer or layer is assigned a bit value of "0" or "1." For example, when the magnitude of detected radial displacement associated with a given piezoelectric wafer or layer exceeds a radial displacement threshold (e.g., 0.05 mm), the associated bit encoding is represented as a "1." Otherwise, the associated bit encoding is represented as a "0."

FIG. 13 illustrates an example piezoelectric wafer for use with embodiments of the present disclosure. In FIG. 13, an example piezoelectric wafer includes characteristics associated with being designed for excitation of thickness modes. An example piezoelectric wafer is associated with a given thickness (e.g., 2.0 mm) and a given diameter (e.g., 17 mm). In some embodiments, the piezoelectric wafer may be a PZT-5A wafer.

FIG. 14 illustrates an example impedance spectra for a transducer according to the piezoelectric wafer of FIG. 13. In FIG. 14, a targeted thickness mode is depicted in a circle (e.g., "1st Thickness Mode: 0.994 MHZ").

FIG. 15A illustrates a schematic of an example rectangular piezoelectric wafer for use with embodiments of the present disclosure. In FIG. 15A, a rectangular piezoelectric wafer may include dimensions Lx, Ly, and thickness h. In embodiments, the thickness h may be significantly smaller than Lx and/or Ly. In certain embodiments, a rectangular piezoelectric wafer may be polarized in a thickness direction (e.g., along the z-axis).

FIG. 15B illustrates example vibrational mode shapes of multiple modes of an example square piezoelectric wafer for use with embodiments of the present disclosure. For example, in FIG. 15B, vibrational mode shapes are shown for a first 36 modes (e.g., up to 1 MHZ) of an example square piezoelectric wafer. In the example shown in FIG. 15B, Lx=Ly=5 mm.

FIG. 15C illustrates example vibrational mode shapes of multiple modes of an example rectangular piezoelectric wafer for use with embodiments of the present disclosure. For example, in FIG. 15C, vibrational mode shapes are shown for a first 12 modes of a rectangular piezoelectric wafer. In the example shown in FIG. 15C, Lx=5 mm, Ly=1 mm.

FIG. 16A illustrates an example non-uniform polarization profile for an example square wafer, for use with embodiments of the present disclosure. FIG. 16B illustrates the electromechanical impedance spectrum of the example square piezoelectric wafer with non-uniform polarization of FIG. 16A to enhance second targeted resonance, according to embodiments of the present disclosure.

FIG. 17A illustrates an example non-uniform polarization profile for an example square wafer, for use with embodiments of the present disclosure. FIG. 17B illustrates the electromechanical impedance spectrum of the example square piezoelectric wafer with non-uniform polarization of FIG. 17B to enhance third targeted resonance, according to embodiments of the present disclosure.

FIG. 18A illustrates an example non-uniform polarization profile for an example square wafer, for use with embodiments of the present disclosure. FIG. 18B illustrates an electromechanical impedance spectrum of the example square piezoelectric wafer with non-uniform polarization of FIG. 18A to enhance both second and third targeted resonances, according to embodiments of the present disclosure.

FIG. 19A illustrates an example rectangular piezoelectric wafer with uniform polarization, for use with embodiments of the present disclosure. FIG. 19B illustrates an electromechanical impedance spectrum of the example rectangular piezoelectric wafer with uniform polarization of FIG. 19A, according to embodiments of the present disclosure.

FIG. 20A illustrates an example non-uniform polarization profile for an example rectangular piezoelectric wafer, according to embodiments of the present disclosure. FIG. 20B illustrates an electromechanical impedance spectrum of the example rectangular piezoelectric wafer with non-uniform polarization of FIG. 20A to enhance second targeted resonance, according to embodiments of the present disclosure.

FIG. 21A illustrates an example non-uniform polarization profile for an example rectangular piezoelectric wafer, for use with embodiments of the present disclosure. FIG. 21B illustrates an electromechanical impedance spectrum of the example rectangular piezoelectric wafer with non-uniform polarization of FIG. 21A to enhance third targeted resonance, according to embodiments of the present disclosure.

FIG. 22A illustrates an example non-uniform polarization profile for an example rectangular piezoelectric wafer, for use with to embodiments of the present disclosure. FIG. 22B illustrates an electromechanical impedance spectrum of the example rectangular piezoelectric wafer with non-uniform polarization of FIG. 22A to enhance fourth targeted resonance, according to embodiments of the present disclosure.

FIG. 23A illustrates an example non-uniform polarization profile for an example rectangular piezoelectric wafer, for use with embodiments of the present disclosure. FIG. 23B illustrates an electromechanical impedance spectrum of the example rectangular piezoelectric wafer with non-uniform polarization of FIG. 23A to suppress all the resonances observed in FIG. 22B, according to embodiments of the present disclosure.

The present invention is not to be limited in scope by the embodiments disclosed herein, which are intended as single illustrations of individual aspects of the invention, and any which are functionally equivalent are within the scope of the invention. Various modifications to the models and methods of the invention, in addition to those described herein, will become apparent to those skilled in the art from the foregoing description and teachings, and are similarly intended to fall within the scope of the invention. Such modifications or other embodiments can be practiced without departing from the true scope and spirit of the invention.

It should be understood that the examples and embodiments described herein are for illustrative purposes only and that various modifications or changes in light thereof will be suggested to persons skilled in the art and are to be included within the spirit and purview of this application.

What is claimed is:

1. A method of storing information using acoustic and/or vibration responses of piezoelectric wafers or layers, the method comprising:
   generating a non-uniformly polarized piezoelectric wafer by non-uniformly polarizing a piezoelectric wafer or layer to enhance or suppress specific in-plane resonance modes of a vibration of the piezoelectric wafer or layer; and storing different states or multiple levels of information using one or more of enhanced or suppressed resonances of the non-uniformly polarized piezoelectric wafer.

2. The method of claim 1, wherein the non-uniformly polarized piezoelectric wafer has a polarization profile such that it is visibly indistinguishable from another non-uniformly polarized piezoelectric wafer having a different polarization profile.

3. The method of claim 1, wherein the piezoelectric wafer or layer comprises one or more of piezoelectric ceramic, polycrystalline, lead zirconate titanate, or other piezoelectric material.

4. The method of claim 1, wherein the non-uniformly polarized piezoelectric wafer comprises one or more of a piezoelectric disc shaped wafer, a piezoelectric square shaped wafer, a piezoelectric rectangularly shaped wafer, or a piezoelectric arbitrarily shaped wafer.

5. The method of claim 1, wherein the piezoelectric wafer or layer comprises one or more piezoelectric elements having one or more of a de-poled polarization profile, uniformly polarization profile or a non-uniform polarization profile.

6. The method of claim 1, wherein the non-uniformly polarized piezoelectric wafer comprises an identification layout comprising a grid or array layout.

7. The method of claim 6, wherein the grid or array layout can be made either optically readable or unreadable.

8. A method of information retrieval, comprising:
exciting one or more non-uniformly polarized piezoelectric layers;
measuring one or more of a displacement, a conductance, an admittance response, a susceptance response, or an electrical impedance associated with each non-uniformly polarized piezoelectric layer of the one or more non-uniformly polarized piezoelectric layers; and
associating one or more information states with one or more of each non-uniformly polarized piezoelectric layer or each section of a plurality of sections of each non-uniformly polarized piezoelectric layer based on a comparison of the displacement, the conductance, the admittance response, the susceptance response, or the electrical impedance associated therewith and a threshold.

9. The method of claim 8, wherein one or more non-uniformly polarized piezoelectric layers of the one or more non-uniformly polarized piezoelectric layers comprises one or more of piezoelectric ceramic, polycrystalline, lead zirconate titanate, or other piezoelectric material.

10. The method of claim 8, wherein the one or more non-uniformly polarized piezoelectric layers comprise an identification layout comprising a grid or array layout.

11. The method of claim 8, wherein one or more non-uniformly polarized piezoelectric layers of the one or more non-uniformly polarized piezoelectric layers comprises one or more of a piezoelectric disc shaped wafer, a piezoelectric square shaped wafer, a piezoelectric rectangularly shaped wafer, or a piezoelectric arbitrarily shaped wafer.

12. The method of claim 8, wherein one or more non-uniformly polarized piezoelectric layers of the one or more non-uniformly polarized piezoelectric layers has one or more of a de-poled polarization profile, a uniform polarization profile, or a non-uniform polarization profile.

13. An apparatus, comprising:
a non-uniformly polarized piezoelectric layer having a first surface and a second surface;
a first insulating layer positioned adjacent the first surface and a second insulating layer positioned adjacent the second surface; and
a housing configured for housing the non-uniformly polarized piezoelectric layer, the first insulating layer, and the second insulating layer, wherein a first spacer layer is positioned between a proximal end of the housing and the first insulating layer and a second spacer layer is positioned between a distal end of the housing and the second insulating layer.

14. The apparatus of claim 13, wherein the non-uniformly polarized piezoelectric layer comprises a thickness and a diameter.

15. The apparatus of claim 14, wherein the thickness and diameter configure the non-uniformly polarized piezoelectric layer for excitation of radial modes.

16. The apparatus of claim 14, wherein the thickness is between 0.01 millimeter (mm) and 50 mm, and wherein the diameter is between 0.1 mm and 200 mm.

17. The apparatus of claim 13, wherein the housing comprises acrylic and a reflective coating.

18. The apparatus of claim 13, wherein the first spacer layer comprises acrylic and the second spacer layer comprises acrylic.

19. The apparatus of claim 13, wherein the non-uniformly polarized piezoelectric layer comprises one or more of piezoelectric ceramic, polycrystalline, lead zirconate titanate, or other piezoelectric material.

20. The apparatus of claim 13, wherein the non-uniformly polarized piezoelectric layer comprises one or more piezoelectric elements having one or more of a de-poled polarization profile, a uniform polarization profile, or a non-uniform polarization profile.

21. An apparatus, comprising:
a plurality of non-uniformly polarized piezoelectric wafers each having a first surface and a second surface;
a first substrate adjacent the plurality of non-uniformly polarized piezoelectric wafers along the first surface of each non-uniformly polarized piezoelectric wafer of the plurality of non-uniformly polarized piezoelectric wafers; and
a second substrate adjacent the plurality of non-uniformly polarized piezoelectric wafers along the second surface of each non-uniformly polarized piezoelectric wafer of the plurality of non-uniformly polarized piezoelectric wafers,
wherein each non-uniformly polarized piezoelectric wafer is positioned relative to other non-uniformly polarized piezoelectric wafers of the plurality of non-uniformly polarized piezoelectric wafers according to an identification layout.

22. The apparatus of claim 21, wherein each non-uniformly polarized piezoelectric wafer is associated with a diameter and a thickness.

23. The apparatus of claim 22, wherein the diameter and thickness configure the non-uniformly polarized piezoelectric wafer for excitation of thickness modes.

24. The apparatus of claim 22, wherein the thickness is between 0.01 mm and 50 mm, and wherein the diameter is between 0.1 mm and 200 mm.

25. The apparatus of claim 21, wherein the first substrate and the second substrate comprise one or more of electrically conductive layers.

26. The apparatus of claim 21, wherein one or more non-uniformly polarized piezoelectric wafer of the plurality of non-uniformly polarized piezoelectric wafers comprises one or more of piezoelectric ceramic, polycrystalline, lead zirconate titanate, or other piezoelectric material.

27. The apparatus of claim 21, wherein the identification layout comprises a grid or array layout.

28. The apparatus of claim 21, wherein one or more of the plurality of non-uniformly polarized piezoelectric wafers comprises one or more of a piezoelectric disc shaped wafer, a piezoelectric square shaped wafer, a piezoelectric rectangularly shaped wafer, or a piezoelectric arbitrarily shaped wafer.

29. The apparatus of claim 21, wherein one or more of the plurality of non-uniformly polarized piezoelectric wafers comprises one or more piezoelectric elements having one or more of a de-poled polarization profile, a uniform polarization profile, or a non-uniform polarization profile.

* * * * *